US012174652B2

(12) United States Patent
Karc et al.

(10) Patent No.: US 12,174,652 B2
(45) Date of Patent: *Dec. 24, 2024

(54) LOAD-SENSING REMOTE CONTROL DEVICE FOR USE IN A LOAD CONTROL SYSTEM

(71) Applicant: Lutron Technology Company LLC, Coopersburg, PA (US)

(72) Inventors: Jeffrey Karc, Danielsville, PA (US); Jordan H. Crafts, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/435,872

(22) Filed: Jun. 10, 2019

(65) Prior Publication Data

US 2020/0033902 A1 Jan. 30, 2020

Related U.S. Application Data

(63) Continuation of application No. 14/578,220, filed on Dec. 19, 2014, now Pat. No. 10,317,923.

(Continued)

(51) Int. Cl.

*G05F 1/66* (2006.01)
*H05B 39/08* (2006.01)

(Continued)

(52) U.S. Cl.

CPC ............. *G05F 1/66* (2013.01); *H05B 39/088* (2013.01); *H05B 47/105* (2020.01); *H05B 47/19* (2020.01)

(58) Field of Classification Search

None

See application file for complete search history.

(56) References Cited

U.S. PATENT DOCUMENTS 3,701,870 A 10/1972 Sorenson
4,365,237 A 12/1982 Knight (Continued)

FOREIGN PATENT DOCUMENTS

| | | | | |
|---|---|---|---|---|
| EP | 1524750 | A2 | | 4/2005 |
| JP | 05152077 | A | * | 6/1993 |
| JP | 2011210516 | A | * | 10/2011 |
| JP | 2014115865 | A | * | 6/2014 |
| WO | WO9729560 | | | 8/1997 |
| WO | WO2004077188 | | | 9/2004 |

OTHER PUBLICATIONS

Machine Translation of EP1524750A2 (Year: 2005).

(Continued)

*Primary Examiner* — Jason Lin

(74) *Attorney, Agent, or Firm* — Michael S. Czarnecki; Glen R. Farbanish; Philip N. Smith

(57) ABSTRACT

A load control system, such as a lighting control system, may be configured to control a first electrical load in response to a sensed operational characteristic of a second electrical load. The load control system may include a load control device electrically connected to the first electrical load, and a load-sensing remote control device that is configured to sense an operational characteristic of the second electrical load. The load-sensing remote control device may be configured to communicate with the load control device via wireless communication. The load-sensing remote control device may be configured to transmit messages to the load control device in response to sensing a change in the operational characteristic of the second electrical load. The load control device may be configured to, upon receiving messages from the load-sensing remote control device, control an amount of power that is delivered to the first electrical load.

15 Claims, 6 Drawing Sheets

Related U.S. Application Data

(60) Provisional application No. 61/920,875, filed on Dec. 26, 2013.

(51) Int. Cl.
*H05B 47/105* (2020.01)
*H05B 47/19* (2020.01)

(56) References Cited

U.S. PATENT DOCUMENTS 4,378,525 A * 3/1983 Burdick ................... G01R 1/22 324/117 R
4,498,650 A * 2/1985 Smith ..................... B61L 1/188 246/122 R
4,563,592 A 1/1986 Yuhasz et al.
4,630,248 A 12/1986 Scott
4,889,999 A 12/1989 Rowen
4,972,457 A 11/1990 O'Sullivan
4,989,260 A 1/1991 Meade
5,109,200 A 4/1992 Dushane et al.
5,177,461 A * 1/1993 Budzyna ................ G08B 7/064 40/457
5,239,205 A 8/1993 Hoffman et al.
5,340,954 A 8/1994 Hoffman et al.
5,457,442 A 10/1995 Lucero
5,458,311 A 10/1995 Holbrook
5,510,975 A * 4/1996 Ziegler, Jr. ........... G05B 13/028 706/903
5,818,128 A 10/1998 Hoffman et al.
5,831,395 A 11/1998 Mortimer et al.
5,895,985 A 4/1999 Fischer
5,905,442 A 5/1999 Mosebrook et al.
6,072,284 A 6/2000 Lin
6,211,626 B1 4/2001 Lys et al.
6,320,506 B1 11/2001 Ferraro
6,380,852 B1 4/2002 Hartman et al.
6,528,954 B1 3/2003 Lys et al.
RE38,069 E 4/2003 Posa
6,546,873 B1 4/2003 Andrejkovics et al.
6,650,322 B2 * 11/2003 Dai ....................... G06F 1/3265 345/212
6,803,728 B2 10/2004 Balasubramaniam et al.
6,912,429 B1 * 6/2005 Bilger .................. G08B 25/008 700/19
7,198,523 B2 4/2007 Adams et al.
7,298,833 B2 * 11/2007 Klein ................ H04M 3/42153 379/201.02
7,311,558 B2 12/2007 Adams et al.
7,375,445 B1 5/2008 Smith
7,411,489 B1 * 8/2008 Elwell ................ G08B 13/1645 340/501
7,423,413 B2 9/2008 Dobbins et al.
7,511,628 B2 3/2009 Salvestrini
7,573,208 B2 8/2009 Newman, Jr.
7,687,940 B2 3/2010 Mosebrook et al.
7,772,724 B2 8/2010 Mosebrook et al.
7,778,734 B2 * 8/2010 Oswald .................. G05B 15/02 700/276
7,800,319 B2 9/2010 Raneri
7,847,440 B2 12/2010 Mosebrook et al.
7,865,252 B2 * 1/2011 Clayton ............... H05B 47/175 700/20
7,872,423 B2 1/2011 Biery et al.
7,906,916 B2 3/2011 Gehman
8,008,866 B2 8/2011 Newman, Jr. et al.
8,009,042 B2 8/2011 Steiner et al.
8,049,427 B2 11/2011 Altonen et al.
8,153,918 B2 4/2012 Agronin et al.
8,199,010 B2 6/2012 Sloan et al.
8,212,424 B2 7/2012 Mosebrook et al.
8,212,425 B2 7/2012 Mosebrook et al.
8,228,184 B2 7/2012 Blakeley et al.
8,237,069 B2 8/2012 GaleWyrick et al.
8,258,654 B2 * 9/2012 Parsons ................ H05B 47/115 307/116
8,330,638 B2 12/2012 Altonen et al.
8,410,706 B2 4/2013 Steiner et al.
8,451,116 B2 5/2013 Steiner et al.
8,471,779 B2 6/2013 Mosebrook
8,476,895 B2 * 7/2013 Higuma ................. G01R 21/06 324/142
8,639,391 B1 * 1/2014 Alberth, Jr. ............ G05B 15/02 700/286
8,723,447 B2 5/2014 Steiner
8,731,689 B2 * 5/2014 Platner ................... H05B 47/11 315/312
8,760,293 B2 6/2014 Steiner
8,853,950 B1 10/2014 Chang
9,054,465 B2 6/2015 Hodges
9,167,669 B2 10/2015 Karc et al.
9,208,965 B2 12/2015 Busby et al.
9,210,760 B2 12/2015 Sanders et al.
9,252,595 B2 2/2016 Recker et al.
9,337,663 B2 * 5/2016 Alberth, Jr. ............ G05B 15/02
9,374,424 B2 6/2016 Cheong et al.
9,538,619 B2 1/2017 Swatsky et al.
9,553,451 B2 1/2017 Zaharchuk et al.
9,699,871 B2 7/2017 Karc et al.
9,702,514 B1 7/2017 Colby
9,736,914 B2 8/2017 Pakkala et al.
9,826,604 B2 11/2017 Karc et al.
9,874,332 B1 1/2018 Colby
10,143,071 B2 11/2018 Karc et al.
10,314,148 B2 6/2019 Karc et al.
10,317,923 B2 6/2019 Karc et al.
10,531,546 B1 1/2020 Recker et al.
10,687,409 B2 6/2020 Karc et al.
10,932,347 B2 2/2021 Pennycooke et al.
2002/0000911 A1 1/2002 Hilleary
2002/0047646 A1 4/2002 Lys et al.
2002/0105285 A1 8/2002 Loughrey
2002/0180367 A1 12/2002 Logan
2003/0011538 A1 1/2003 Lys et al.
2004/0133314 A1 * 7/2004 Ehlers ................ G06Q 30/0601 700/276
2004/0155609 A1 8/2004 Lys et al.
2005/0030192 A1 * 2/2005 Weaver ..................... G09F 9/33 340/815.45
2005/0162282 A1 * 7/2005 Dresti .............. H04N 21/42221 340/12.3
2006/0028997 A1 * 2/2006 McFarland ........... H04L 12/282 370/252
2006/0072726 A1 * 4/2006 Klein ................ H04M 3/42263 379/201.01
2007/0007898 A1 * 1/2007 Bruning ................. H05B 45/20 315/34
2007/0043477 A1 * 2/2007 Ehlers .................... G06Q 40/06 700/276
2007/0045431 A1 * 3/2007 Chapman, Jr. ........... F24F 11/30 236/46 C
2007/0061050 A1 * 3/2007 Hoffknecht ............ H05B 47/10 700/291
2007/0146126 A1 * 6/2007 Wang ................... H05B 47/105 340/517
2007/0217211 A1 9/2007 Hewson
2007/0233323 A1 * 10/2007 Wiemeyer ........... H04L 43/0817 700/276
2007/0241615 A1 10/2007 Goodrich
2007/0250189 A1 * 10/2007 Rourke ............... H04L 12/2825 700/90
2008/0024674 A1 * 1/2008 Park ..................... H04N 9/3194 348/687
2008/0027566 A1 * 1/2008 Baek ................... H04L 12/2818 700/3
2008/0083234 A1 * 4/2008 Krebs ................ G05D 23/1932 62/129
2008/0120578 A1 * 5/2008 Wang .................. G06F 3/03543 715/867
2008/0183316 A1 7/2008 Clayton

(56) References Cited

U.S. PATENT DOCUMENTS

2008/0218148 A1* 9/2008 Robertson ......... H02J 13/00002 323/318
2008/0281472 A1* 11/2008 Podgorny .............. G05B 15/02 700/276
2008/0283621 A1* 11/2008 Quirino .................... F24F 11/30 236/1 C
2009/0039854 A1 2/2009 Blakeley
2009/0052859 A1* 2/2009 Greenberger .... H04N 21/44218 386/213
2009/0093234 A1* 4/2009 Cai ...................... H04W 48/16 455/411
2009/0108765 A1 4/2009 Weightman et al.
2009/0141522 A1 6/2009 Adest et al.
2009/0192927 A1 7/2009 Berg et al.
2009/0195192 A1* 8/2009 Joseph ................. H05B 47/185 315/307
2009/0195349 A1* 8/2009 Frader-Thompson ...................... G01R 21/00 340/3.1
2009/0206983 A1 8/2009 Knode et al.
2009/0284169 A1* 11/2009 Valois .................... H05B 47/18 315/291
2009/0299504 A1* 12/2009 Kumazawa ........ G05B 19/4183 700/83
2010/0020550 A1* 1/2010 Kawashima ....... H05B 41/3922 362/362
2010/0026479 A1* 2/2010 Tran ................... A61B 5/02042 340/501
2010/0052894 A1 3/2010 Steiner et al.
2010/0076615 A1 3/2010 Daniel et al.
2010/0127626 A1* 5/2010 Altonen ............... H05B 39/085 315/129
2010/0141153 A1 6/2010 Recker et al.
2010/0148983 A1 6/2010 Huxley et al.
2010/0161706 A1* 6/2010 Kim ...................... H04L 67/125 709/202
2010/0164299 A1 7/2010 Lee et al.
2010/0171430 A1 7/2010 Seydoux
2010/0176661 A1 7/2010 Wilson
2010/0188229 A1 7/2010 Nhep
2010/0207759 A1 8/2010 Sloan et al.
2010/0244706 A1 9/2010 Steiner et al.
2010/0244709 A1 9/2010 Steiner et al.
2010/0256823 A1* 10/2010 Cherukuri ............... H04L 67/12 700/277
2010/0270982 A1 10/2010 Hausman, Jr. et al.
2010/0280667 A1* 11/2010 Steinberg ................. F24F 11/70 700/276
2010/0289430 A1 11/2010 Stelzer et al.
2010/0327766 A1 12/2010 Recker et al.
2011/0010019 A1* 1/2011 Shloush ................. H05B 47/11 700/295
2011/0012433 A1* 1/2011 Parsons ................ H05B 47/115 307/117
2011/0031806 A1 2/2011 Altonen et al.
2011/0083948 A1 4/2011 Mahle
2011/0121654 A1 5/2011 Recker et al.
2011/0133655 A1* 6/2011 Recker ................... H05B 47/13 315/159
2011/0162946 A1 7/2011 Altonen
2011/0163600 A1 7/2011 Garb et al.
2011/0267802 A1 11/2011 Petrillo
2011/0279300 A1 11/2011 Mosebrook
2011/0313560 A1* 12/2011 Hangaard .............. B33Y 30/00 700/120
2012/0001488 A1 1/2012 Puschnigg
2012/0026726 A1 2/2012 Recker et al.
2012/0043889 A1 2/2012 Recker et al.
2012/0049800 A1 3/2012 Johnson et al.
2012/0066168 A1* 3/2012 Fadell .................... G05B 15/02 706/52
2012/0080944 A1 4/2012 Recker et al.
2012/0086272 A1 4/2012 Chen et al.
2012/0091213 A1 4/2012 Altonen et al.
2012/0112666 A1 5/2012 Bennette
2012/0139446 A1 6/2012 Koren et al.
2012/0146538 A1 6/2012 Nerone
2012/0278640 A1 11/2012 Caglianone
2012/0286676 A1 11/2012 Saveri, III et al.
2012/0286689 A1 11/2012 Newman, Jr. et al.
2012/0286940 A1 11/2012 Carmen, Jr. et al.
2012/0293153 A1 11/2012 Garb et al.
2012/0313535 A1 12/2012 Bedell et al.
2013/0013091 A1* 1/2013 Cavalcanti ............. H05B 47/19 700/90
2013/0030589 A1* 1/2013 Pessina .................. H05B 47/19 700/295
2013/0030732 A1 1/2013 Shetty et al.
2013/0214609 A1 8/2013 Carmen, Jr.
2013/0234625 A1* 9/2013 Kondo ................. H05B 47/115 315/313
2013/0274943 A1* 10/2013 Nojima .................. G06Q 50/06 700/295
2013/0282067 A1 10/2013 Van Hulle et al.
2014/0015423 A1 1/2014 Williams
2014/0049164 A1 2/2014 McGuire et al.
2014/0081474 A1 3/2014 Blakeley et al.
2014/0117871 A1 5/2014 Swatsky et al.
2014/0125150 A1* 5/2014 Alberth, Jr. ............... H02J 4/00 307/126
2014/0142724 A1 5/2014 Park et al.
2014/0148923 A1 5/2014 Yamada et al.
2014/0163762 A1* 6/2014 Nakamura .......... H01M 16/006 700/295
2014/0169362 A1 6/2014 Folkmanis et al.
2014/0180486 A1* 6/2014 Newman, Jr. ........... G06F 1/325 700/295
2014/0191573 A1 7/2014 Chen et al.
2014/0244040 A1 8/2014 Alberth, Jr. et al.
2014/0265577 A1 9/2014 Beckman
2014/0265880 A1 9/2014 Taipale et al.
2014/0265881 A1 9/2014 Karc et al.
2014/0265918 A1 9/2014 Cummings
2014/0327369 A1 11/2014 Wendt
2014/0353135 A1 12/2014 Erdmann et al.
2015/0005900 A1 1/2015 Steele et al.
2015/0054341 A1* 2/2015 Holder ................... H01R 24/78 307/38
2015/0054410 A1 2/2015 Sanders et al.
2015/0061497 A1 3/2015 Martins et al.
2015/0088287 A1* 3/2015 Nagamatsu ......... H04L 12/2818 700/90
2015/0130276 A1 5/2015 McNeill-McCallum et al.
2015/0137692 A1 5/2015 Newman, Jr. et al.
2015/0145428 A1 5/2015 Gergely et al.
2015/0145501 A1 5/2015 Ware
2015/0185751 A1* 7/2015 Karc ......................... G05F 1/66 700/295
2015/0189721 A1 7/2015 Karc et al.
2015/0189725 A1 7/2015 Karc et al.
2015/0249337 A1 9/2015 Raneri et al.
2016/0041573 A1 2/2016 Chen et al.
2016/0065004 A1 3/2016 Fritsch et al.
2016/0192458 A1 6/2016 Keith
2016/0205745 A1 7/2016 Saveri, III et al.
2016/0290616 A1 10/2016 Pantaleo
2017/0085070 A1 3/2017 AbuGhazaleh
2017/0194789 A1 7/2017 Chen et al.
2018/0014392 A1 1/2018 Charlton et al.
2018/0035520 A1 2/2018 Karc et al.
2018/0110114 A1 4/2018 Karc et al.
2019/0098735 A1 3/2019 Karc et al.
2019/0394861 A1 12/2019 Karc et al.
2020/0352004 A1 11/2020 Chu

OTHER PUBLICATIONS

Farivar, Cyrus, "Shake, Rattle and Roll: How We Got a Washing Machine to Text When it's Done", Available at http://arstechnica.com/information-technology/2012/11/shake-rattle-and-roll-how-we-

(56) References Cited

OTHER PUBLICATIONS got-a-washing-machine-to-text-when-its-done/?comments=1, Nov. 25, 2012, pp. 1-12.
International Search Report and Written Opinion, International Application No. PCT/US16/20708; International Filing date May 3, 2016; date of mailing May 17, 2016.
"Where to find a remote power outlet switched on/off by another outlet?" Web blog Post. Ask Meta Filter. 1999-2017 MetaFilter Network Inc. Jan. 20, 2011 6:26 PM. http://ask.metafilter.com/176304/Where-to-find-a-remote-power-outlet-switched-onoff-by-another-outlet. Web Date Accessed Apr. 14, 2017.
Cree, "Cree Reinvents the Three-Way LED Bulb", Available at http://www.cree.com/News-and-Events/Cree-News/Press-Releases/2014/June/3way-bulb, Jun. 4, 2014, 1 page.
Hunterdouglas, "Introduction to the Platinum™ RF Adapter", 2011, 2 pages.
Hunterdouglas, "Platinum Technology Accessories", 2011, 4 pages.

* cited by examiner

LOAD-SENSING REMOTE CONTROL DEVICE FOR USE IN A LOAD CONTROL SYSTEM

CROSS-REFERENCE TO RELATED APPLICATIONS

This application is a continuation of U.S. patent application Ser. No. 14/578,220, filed Dec. 19, 2014, now U.S. Pat. No. 10,317,923, issued Jun. 11, 2019, which claims priority to U.S. provisional patent application No. 61/920,875, filed Dec. 26, 2013, which is incorporated herein by reference in its entirety.

BACKGROUND

Electrical loads, such as lamps, ceiling lighting fixtures, thermostats, shades, etc., may be controlled using load control devices. A load control device may be configured for wireless communication. For instance, a dimmer switch may be configured for radio-frequency wireless communication (e.g., configured as an RF dimmer switch). Such a load control device may be associated with one or more devices in a load control system, such as a lighting control system. A load control device that participates in a load control system may receive wirelessly communicated messages (e.g., including commands) from one or more other devices of the load control system. The messages may cause the load control device to adjust the amount of power delivered to one or more electrical loads that are connected to the load control device.

FIG. 1 depicts an example prior art lighting control system 10 that includes a tabletop RF dimmer switch 20 and a lamp 30 that is plugged into the dimmer switch 20, such that the dimmer switch 20 may be operated to control the amount of power delivered to the lamp 30. The dimmer switch 20 may be electrically connected to an electrical circuit that includes an alternating-current (AC) power source 40 and an AC outlet 42 that is electrically connected to the AC power source 40. The AC outlet 42 includes an upper switched receptacle 41 and a lower unswitched receptacle 43. The electrical circuit further includes a wall-mounted switch 46 that is coupled in series electrical connection between the AC power source 40 and the upper switched receptacle 41. The lamp 30 may be controlled by the wall-mounted switch 46. The dimmer switch 20 includes a plug 22 that is plugged into the switched receptacle 41. The lamp 30 includes a plug 32 that is plugged into the plug 22 of the dimmer switch 20, such that the delivery of AC power to the lamp 30 may be controlled via the wall-mounted switch 46.

The lighting control system 10 may further include one or more devices that are configured to wirelessly communicate with the dimmer switch 20. As shown, the lighting control system 10 includes an occupancy and/or vacancy sensor 50, a daylight sensor 60, and a remote control device 70, such as a remote keypad. One or more of the occupancy and/or vacancy sensor 50, the daylight sensor 60, and the remote control device 70 may wirelessly communicate with the dimmer switch 20 via RF signals 90, for example to command the dimmer switch 20 to adjust the amount of AC power that is provided to the lamp 30.

Control of the illustrated lighting control system 10 may be compromised when power is removed from the upper switched receptacle 41 of the outlet 42. For instance, when the wall switch 46 is turned off, a wireless communication component of the dimmer switch 20, such as a receiver, may be unpowered and thus unable to receive wirelessly communicated commands. This may undesirably render the dimmer switch 20 unresponsive to wirelessly communicated commands from the occupancy and/or vacancy sensor 50, the daylight sensor 60, and the remote control 70, such as commands to turn on, turn off, or dim the lamp 30.

Plugging the dimmer switch 20 into the lower unswitched receptacle 43 of the outlet 42 may ensure continuous power of the wireless communication component of the dimmer switch 20, but would remove the ability to switch power to the lamp 30 using the wall-mounted switch 46. This may be undesirable to a user of the lighting control system 10. A user of the lighting control system 10 may prefer to be able to switch power to the lamp 30 via the wall-mounted switch 46, while ensuring that the lamp 30 remains controllable by the dimmer switch 20, for instance via one or more of the occupancy and/or vacancy sensor 50, the daylight sensor 60, and the remote control 70.

SUMMARY

As described herein, a load control system, such as a lighting control system, may be configured to control a first electrical load in response to a sensed operational characteristic of a second electrical load. The load control system may include a load control device that is electrically connected to the first electrical load. The load control device may be configured to control an amount of power, for example alternating-current (AC) power, that is delivered to the first electrical load. The load control device may be configured for wireless communication, for example via wireless signals, such as radio frequency (RF) signals.

The load control system may further include a load-sensing remote control device that is configured to sense an operational characteristic of the second electrical load. The operational characteristic may include, for example, a lighting intensity of the second electrical load, a load current that flows through the second electrical load, a sound emitted by the second electrical load, or another operational characteristic. The load-sensing remote control device may be configured for wireless communication, and may be associated with the load control device, for instance during a configuration procedure of the load control system.

The load-sensing remote control device may be configured to transmit one or more messages, for instance via wireless communication, in response to sensing a change in the operational characteristic of the second electrical load. The one or more messages may include information that is related to the sensed change of the operational characteristic. The load-sensing remote control device may be configured to transmit the one or more messages to a device that is associated with the load-sensing remote control device, such as the load control device that is electrically connected to the first electrical load.

The load control device may be configured to, upon receiving one or more messages from the load-sensing remote control device that include information related to the sensed change of the operational characteristic, control the amount of power (e.g., AC power) that is delivered to the first electrical load. For example, if the first electrical load comprises a lighting load, the load control device may adjust an intensity of the lighting load in response to receiving the one or more messages, or may cause lighting load to blink in response to receiving the one or more messages.

DETAILED DESCRIPTION

Figure 2:
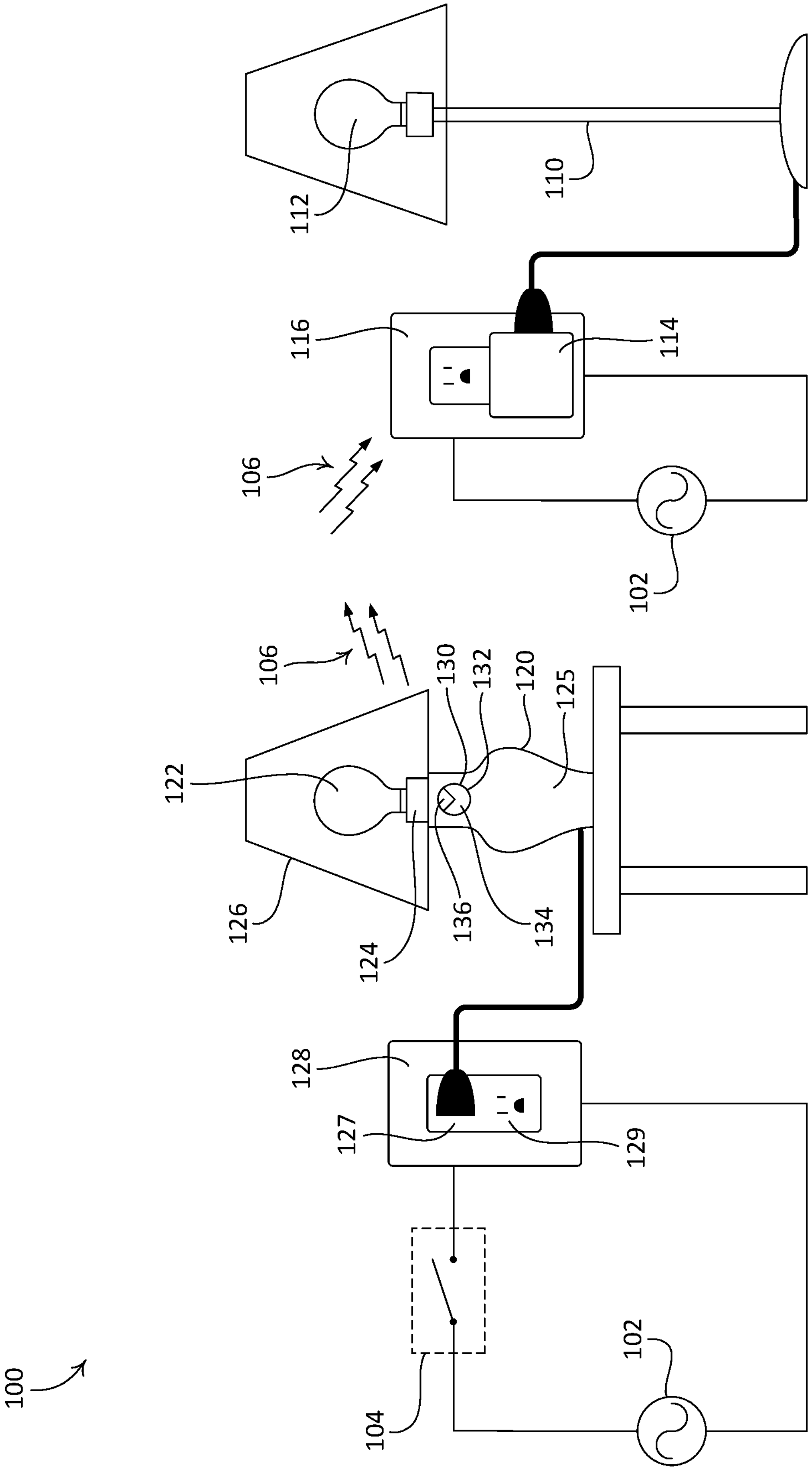
FIG. 2 depicts an example load control system that is configured to control a first electrical load in response to a sensed characteristic of a second electrical load.

FIG. 2 depicts an example load control system that is configured as a lighting control system 100. The lighting control system 100 may include various components that are associated with each other, and that are configured to communicate with one another, for instance via wireless communication. The components of the lighting control system 100 may include, for example one or more load control devices, one or more electrical loads that are controlled via the one or more load control devices, and/or one or more control devices (e.g., load-sensing remote control devices) that are configured to control the load control devices.

As shown, the lighting control system 100 includes a floor lamp 110 and a table lamp 120. A lighting load, such as a standard light bulb 112, may be installed in the floor lamp 110. The lighting control system 100 may further include a load control device, such as the plug-in load control device 114. The plug-in load control device 114 may be plugged into a first electrical outlet 116 that receives power from a power source, such as an alternating-current (AC) power source 102. The plug-in load control device 114 may define a receptacle that is configured to receive a plug (e.g., a standard electrical plug). The floor lamp 110 may be plugged into the receptacle of the plug-in load control device 114.

Figure 1:
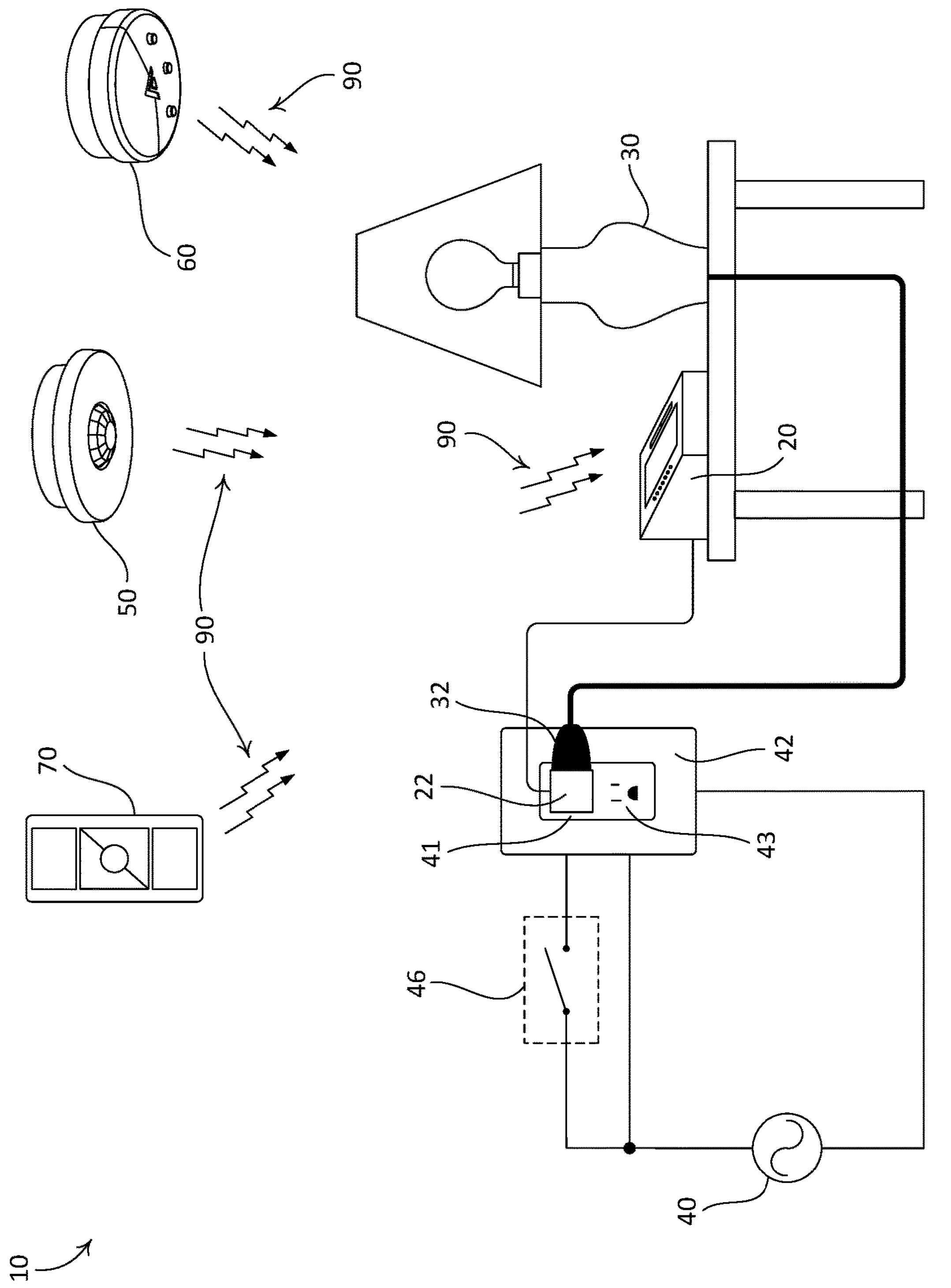
FIG. 1 (PRIOR ART)
FIG. 1 depicts a prior art lighting control system.

The plug-in load control device 114 may be configured to adjust an amount of power (e.g., AC power) that is delivered to the floor lamp 110, and thus to control an intensity of the light bulb 112, for instance between a low end intensity (e.g., approximately 1%) and a high-end intensity (e.g., approximately 100%). The plug-in load control device 114 may be configured for wireless communication. For example, the plug-in load control device 114 may be configured to receive one or more messages (e.g., digital messages) via wireless signals, such as radio-frequency (RF) signals 106, and may be configured to turn the light bulb 112 on and off, and/or to adjust the intensity of the light bulb 112, in response to one or more received messages. The lighting control system 100 is not limited to the illustrated plug-in load control device 114. For example, the lighting control system 100 may alternatively include a tabletop load control device, such as the tabletop RF dimmer switch 20 shown in FIG. 1, a screw-in controllable light source, a wall-mounted dimmer switch, or the like.

A lighting load, such as a standard light bulb 122, may be installed in the table lamp 120. The table lamp 120 may have a screw-in Edison socket 124, into which the light bulb 122 is installed, a base 125 to which the socket 124 is connected, and a lamp shade 126 that is positioned around the light bulb 122. The table lamp 120 may be plugged into a second electrical outlet 128 that receives power from the AC power source 102. The second electrical outlet 128 may have an upper switched receptacle 127 and a lower unswitched receptacle 129. The lower unswitched receptacle 129 may be directly coupled to the AC power source 102, and the upper switched receptacle 127 may be coupled to the AC power source 102 through a standard wall-mounted mechanical switch 104 (e.g., a toggle switch or a standard light switch). The light bulb 122 may be turned on and off in response to actuations of the mechanical switch 104. The mechanical switch 104 may comprise, for example, a maintained single-pole mechanical switch. Alternatively, the mechanical switch 104 may comprise a wall-mounted load control device, such as, for example, a dimmer switch for controlling the intensity of the light bulb 122. The table lamp 120 may alternatively, or additionally, comprise an actuator (e.g., a mechanical switch) for turning the light bulb 122 on and off.

The lighting control system 100 may be configured such that the floor lamp 110 may be controlled in response to a sensed operational characteristic of the table lamp 120. The floor lamp 110 may be referred to as a first electrical load, and the table lamp 120 may be referred to as a second electrical load. In this regard, the lighting control system 100 may be configured to control a first electrical load in response to a sensed operational characteristic of a second electrical load. The operational characteristic may comprise, for example, a light intensity of the light bulb 122. It should be appreciated that alternatively, the table lamp 120 may be referred to as a first electrical load, and the floor lamp 110 may be referred to as a second electrical load, for example depending upon a perspective from which the lighting control system 100 is viewed.

The lighting control system 100 may further include a load-sensing remote control device that is configured to enable the control of a first electrical load of the lighting control system 100 in response to a sensed operational characteristic of a second electrical load of the lighting control system 100. For example, as shown, the lighting control system 100 further includes a load-sensing remote control device 130 that comprises a battery-powered wireless light sensor 132. The illustrated light sensor 132 includes a housing 134. The light sensor 132 may comprise an internal photosensitive circuit, for instance a photosensitive diode (not shown), which may be enclosed in the housing 134. The housing 134 may include having a lens 136 that is configured to conduct light from outside the light sensor 132 towards the internal photosensitive diode. The light sensor 132 may be configured to sense an operational characteristic of a source of light. For example, the light sensor 132 may be configured to measure an intensity of light emitted from a light source (e.g., a light bulb), may be configured to monitor for and/or to recognize variation in the intensity of light emitted from a light source (e.g., an LED changing state from off to illuminated, an LED changing state from illuminated to off, an LED blinking), or the like.

As shown, the load-sensing remote control device 130 may be attached to the base 125 of the table lamp 120, and positioned such that the light sensor 132 may measure an intensity of light emitted by the light bulb 122. In an alternative configuration, the load-sensing remote control device 130 may be mounted to the lamp shade 126, or to another structure of the table lamp 120, and positioned such that the light sensor 132 may measure an intensity of light emitted by the light bulb 122. Alternatively still, the load-sensing remote control device 130 may be mounted in a manner other than directly mounted to the table lamp 120. For example, the load-sensing remote control device 130 may be mounted on a tabletop, adjacent to the base 125 of the table lamp 120. The load-sensing remote control device 130 may be integrated into another control device, such as a tabletop dimmer switch. Examples of light sensors are described in greater detail in commonly assigned U.S. Pat. No. 8,410,706, issued Apr. 2, 2013, entitled "Method Of Calibrating A Daylight Sensor," and U.S. Pat. No. 8,451, 116, issued May 28, 2013, entitled "Wireless Battery Powered Daylight Sensor," the entire disclosures of which are incorporated herein by reference.

The load-sensing remote control device 130 may include a control circuit (not shown), and a wireless communication circuit (not shown) that is communicatively coupled to (e.g., configured to transmit electrical signals to) the control circuit. The control circuit may comprise, for example, a microprocessor. The wireless communication circuit may comprise, for example, a transmitter, such as an RF transmitter, that is configured to transmit messages (e.g., via RF signals 106) in response to light detected by the internal photosensitive circuit. The plug-in load control device 114 may be associated with the load-sensing remote control device 130, for example during a configuration procedure of the lighting control system 100, such that the plug-in load control device 114 is responsive to messages transmitted by the load-sensing remote control device 130. For example, the plug-in load control device 114 may be associated with the load-sensing remote control device 130 by pressing and holding respective buttons (e.g., programming buttons) on each of the plug-in load control device 114 and the load-sensing remote control device 130. The load-sensing remote control device 130 may further include a power source, such as a battery (not shown), for powering the internal photosensitive circuit, the control circuit, the wireless communication circuit, and/or other circuitry of the load-sensing remote control device 130.

The load-sensing remote control device 130 may be configured to sense the operational characteristic of an electrical load (e.g., the light intensity of the light bulb 122) continuously, or at predetermined intervals. The load-sensing remote control device 130 may be configured to detect a change in the operational characteristic, for example a change of intensity of the light bulb 122. In response to sensing a change in the operational characteristic, the load-sensing remote control device 130 may transmit one or more messages (e.g., via RF signals 106) to a device that is associated with the lighting control system 100, such as the plug-in load control device 114. For example, the control circuit may cause the wireless communication circuit to transmit the one or more messages in response to a change in intensity of the light bulb 122 that is detected by the internal photosensitive circuit.

The one or more messages may include information related to the sensed change of the operational characteristic. The information may include, for example, a measurement of light intensity. The one or messages may include, for example, commands that cause one or more load control devices that are associated with the load-sensing remote control device 130 to adjust the intensities of corresponding lighting loads in accordance with the sensed change of the operational characteristic. For example, one or more messages transmitted by the load-sensing remote control device 130 may include one or more commands that cause the plug-in load control device 114 to adjust the intensity of the light bulb 112, for example to synchronize an intensity of the light bulb 112 with the measured intensity of the light bulb 122.

The load-sensing remote control device 130 may be configured to operate as a state change device. The load-sensing remote control device 130 may be configured to transmit one or more messages that are indicative of a change of state within the lighting control system 100, for example indicative of a change of state of the mechanical switch 104, and thus of the light bulb 122. Such messages may be referred to as change of state messages, or as change of state signals, and may be interpreted by one or more devices that are associated with the load-sensing remote control device 130, such as the plug-in load control device 114, as indications (e.g., commands) to turn on, turn off, dim, etc. respective lighting loads. For example, the plug-in load control device 114 may be configured to receive one or more messages transmitted by the load-sensing remote control device 130, and may be configured to turn the light bulb 112 on and off in response to the one or more received messages (e.g., to synchronize the light bulb 112 in the floor lamp 110 with the light bulb 122 in the table lamp 120).

In an alternative example configuration, the mechanical switch 104 may be replaced with a dimmer switch (not shown). In such a configuration, the load-sensing remote control device 130 may be configured to measure an intensity of the light bulb 122 in the table lamp 120, and to transmit one or more messages that are representative of the measured light intensity (e.g., including the measured light intensity) to the plug-in load control device 114 (e.g., via RF signals 106), which may cause the plug-in load control device 114 to synchronize the intensity of the light bulb 112 in the floor lamp 110 with the light bulb 122 in the table lamp 120. Examples of state change devices are described in greater detail in commonly assigned U.S. patent application Ser. No. 13/830,102, filed Mar. 14, 2013, entitled "State Change Devices For Switched Electrical Receptacles," the entire disclosure of which is incorporated herein by reference.

In another alternative example configuration, the mechanical switch 104 may be replaced with an "electronic switch" (not shown). Such an electronic switch may include, for example, a microprocessor, a controllable switching circuit such as a relay or a triac, and/or a wireless communication circuit, and may be referred to as a "smart switch." To illustrate, the mechanical switch 104 may be replaced with a "sensor switch" that may include a microprocessor, a wireless communication circuit, and an integrated occupancy sensor circuit. In such a configuration, the sensor switch may interrupt the delivery of power to the lamp 120, for example when the integrated occupancy sensor fails to detect occupancy of a space where the lighting control system 100 is installed. The load-sensing remote control device 130 may be configured to, when the light bulb 122 turns off (e.g., reaches a lowest intensity), transmit one or more messages that are representative of the measured light intensity to the plug-in load control device 114 (e.g., via RF signals 106), which may cause the plug-in load control device 114 to minimize the intensity of (e.g., turn off) the light bulb 112 in the floor lamp 110, thereby synchronizing the light bulb 112 with the light bulb 122 in the table lamp 120. Examples of a sensor switch are described in greater detail in commonly assigned U.S. patent application publication no. 2012/0313535, published Dec. 13, 2012, entitled "Method And Apparatus For Adjusting An Ambient Light Threshold," the entire disclosure of which is incorporated herein by reference.

The plug-in load control device 114 may be further configured to be responsive to one or more other types of input devices, such as, for example: occupancy sensors; vacancy sensors; daylight sensors; radiometers; cloudy day sensors; temperature sensors; humidity sensors; pressure sensors; smoke detectors; carbon monoxide detectors; air-quality sensors; motion sensors; security sensors; proximity sensors; fixture sensors; partition sensors; keypads; battery powered remote controls; kinetic or solar-powered remote controls; key fobs; cell phones; smart phones; tablets; personal digital assistants; personal computers; laptops; timeclocks; audio-visual controls; safety devices; power monitoring devices, such as power meters, energy meters, utility submeters, or utility rate meters; central control transmitters; residential, commercial, or industrial controllers; or any combination of these or like input devices.

The load-sensing remote control device 130 and the plug-in load control device 114 may be associated with (e.g., may participate in) a larger RF load control system. For example, the lighting control system 100 may further include a central controller (not shown), and the load-sensing remote control device 130 may be configured to transmit one or more messages to the central controller. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," U.S. patent application Ser. No. 12/033,223, filed Feb. 19, 2008, entitled "Communication Protocol For A Radio Frequency Load Control System," and U.S. patent application Ser. No. 13/725,105, filed Dec. 21, 2012, entitled "Load Control System Having Independently-Controlled Units Responsive To A Broadcast Controller," the entire disclosures of which are incorporated herein by reference.

The lighting control system 100 may further include, independently or in any combination, one or more other types of load control devices, such as, for example: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

Figure 3:
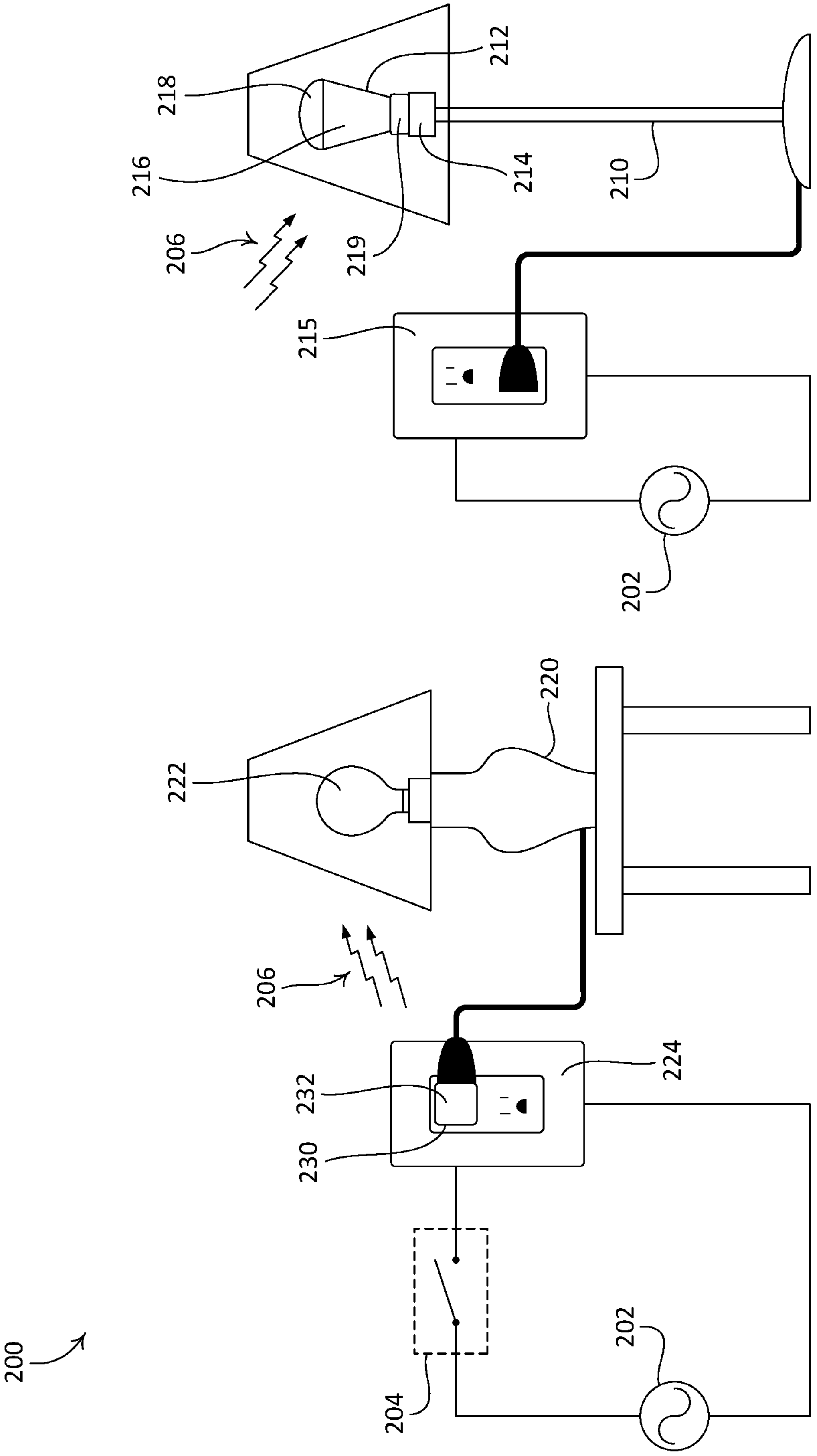
FIG. 3 depicts another example load control system that is configured to control a first electrical load in response to a sensed characteristic of a second electrical load.

FIG. 3 depicts another example load control system that is configured as a lighting control system 200. The lighting control system 200 may include various components that are associated with each other, and that are configured to communicate with one another, for instance via wireless communication. The components of the lighting control system 200 may include, for example one or more load control devices, one or more electrical loads that are controlled via the one or more load control devices, and/or one or more control devices (e.g., load-sensing remote control devices) that are configured to control the load control devices.

As shown, the lighting control system 200 includes a floor lamp 210 and a table lamp 220. A lighting load, such as a controllable light source 212, may be installed in the floor lamp 210. The floor lamp 210 may be plugged into a first electrical outlet 215 that receives power from a power source, such as an AC power source 202. The floor lamp 210 may have a screw-in Edison socket 214, into which the controllable light source 212 is installed. The controllable light source 212 may include an integral lighting load (not shown) and an integral load regulation circuit (not shown).

The illustrated controllable light source 212 includes a housing 216 (e.g., a glass housing) that defines a front surface 218. The controllable light source 212 further includes an integral lighting load (not shown). The integral lighting load may comprise, for example, an incandescent lamp, a halogen lamp, a compact fluorescent lamp, a light-emitting diode (LED) light engine, or other suitable light source. The lighting load may be located within the housing 216 (e.g., surrounded by the housing 216), and may be configured such that light generated by the integral lighting load shines out of the front surface 218 and/or the sides of the housing 216. The front surface 218 of the housing 216 may be transparent or translucent, and may be dome shaped as shown, or flat. The controllable light source 212 further includes an enclosure portion 219 to which the housing 216 is attached, and a screw-in base (not shown) that is attached to the enclosure portion 219. The screw-in base may be configured to be screwed into a standard Edison socket (e.g., the socket 214 of the floor lamp 210), such that the controllable light source 212 is placed in electrical communication with (e.g., is electrically connected to) the AC power source 202. Examples of screw-in luminaires are described in greater detail in commonly assigned U.S. Pat. No. 8,008,866, issued Aug. 30, 2011, entitled "Hybrid Light Source," U.S. patent application publication no. 2012/0286689, published Nov. 15, 2012, entitled "Dimmable Screw-In Compact Fluorescent Lamp Having Integral Electronic Ballast Circuit," and U.S. patent application Ser. No. 13/829,834, filed Mar. 14, 2013, entitled "Controllable Light Source," the entire disclosures of which are incorporated herein by reference.

The integral load regulation circuit of the controllable light source 212 may be located within (e.g., housed inside) the enclosure portion 219. The integral load regulation circuit may comprise, for example, a dimmer circuit, a ballast circuit, or an LED driver circuit, for controlling the intensity of the integral lighting load between a low-end intensity (e.g., approximately 1%) and a high-end intensity (e.g., approximately 100%). The controllable light source 212 may further include a control circuit (e.g., a microprocessor) and a wireless communication circuit (e.g., comprising an RF receiver) that may be housed inside the enclosure portion 219. The control circuit may be configured to control the integral lighting load (e.g., via the integral load regulation circuit) in response to one or more messages (e.g., digital messages) that are received by the wireless communication circuit (e.g., via RF signals 206). For example, the controllable light source 212 may be configured to, upon receiving one or more messages (e.g., via RF signals 206), turn the integral lighting load on and/or off. The lighting control system 200 is not limited to the integral load regulation circuit of the controllable light source 212. For example, the lighting control system 200 may alternatively include a tabletop load control device, such as the tabletop RF dimmer switch 20 shown in FIG. 1, a plug-in load control device, such as the plug-in load control device 114 shown in FIG. 2, a wall-mounted dimmer switch, or the like, that is configured to control a standard light bulb that is installed in the socket 214 of the floor lamp 210.

A lighting load, such as a standard light bulb 222, may be installed in the table lamp 220. As shown, the table lamp 220 is plugged indirectly into a second electrical outlet 224 that receives power from the AC power source 202 through a standard wall-mounted mechanical switch 204 (e.g., a toggle switch or a standard light switch), such that the light bulb 222 may be turned on and off in response to actuations of the mechanical switch 204. The mechanical switch 204 may comprise, for example, a maintained single-pole mechanical switch. Alternatively, the mechanical switch 204 may comprise a wall-mounted load control device, such as, for example, a dimmer switch for controlling the intensity of the light bulb 222. The table lamp 220 may alternatively, or additionally, comprise an actuator (e.g., a mechanical switch) for turning the light bulb 222 on and off.

The lighting control system 200 may be configured such that the controllable light source 212 may be controlled in response to a sensed operational characteristic of the table lamp 220. The controllable light source 212 may be referred to as a first electrical load, and the table lamp 220 may be referred to as a second electrical load. In this regard, the lighting control system 200 may be configured to control a first electrical load in response to a sensed operational characteristic of a second electrical load. The operational characteristic may comprise, for example, a load current that is flowing from the AC power source 202, through the light bulb 222. It should be appreciated that alternatively, the table lamp 220 may be referred to as a first electrical load, and the controllable light source 212 may be referred to as a second electrical load, for example depending upon a perspective from which the lighting control system 200 is viewed.

The lighting control system 200 may further include a load-sensing remote control device that is configured to enable the control of a first electrical load of the lighting control system 200 in response to a sensed operational characteristic of a second electrical load of the lighting control system 200. For example, as shown, the lighting control system 200 further includes a load-sensing remote control device 230 that comprises an in-series plug-in remote control device 232. The in-series plug-in remote control device 232 may define a receptacle that is configured to receive a plug (e.g., a standard electrical plug). As shown, the load-sensing remote control device 230 may be plugged into the second electrical outlet 224, and the table lamp 220 may be plugged into the load-sensing remote control device 230, such that the load-sensing remote control device 230 is coupled in series electrical connection between the AC power source 202 and the light bulb 222.

The load-sensing remote control device 230 may comprise a sensing circuit (not shown) that is coupled in series electrical connection with the light bulb 222, and that is configured to detect and/or measure a load current that flows from the AC power source 202, through the light bulb 222. The load-sensing remote control device 230 may further include a control circuit (not shown), and a wireless communication circuit (not shown) that is communicatively coupled to the control circuit. The control circuit may comprise, for example, a microprocessor. The wireless communication circuit may comprise, for example, a transmitter, such as an RF transmitter, that is configured to transmit messages (e.g., via RF signals 206) in response to the load current detected by the sensing circuit. The controllable light source 212 may be associated with the load-sensing remote control device 230, for example during a configuration procedure of the lighting control system 200, such that the controllable light source 212 is responsive to messages transmitted by the load-sensing remote control device 230.

The load-sensing remote control device 230 may be configured to sense the operational characteristic of an electrical load (e.g., the load current that flows through the light bulb 222) continuously, or at predetermined intervals. The load-sensing remote control device 230 may be configured to detect a change in the operational characteristic, for example a change of a magnitude of the load current flowing from the AC power source 202 through the light bulb 222. In response to sensing a change in the operational characteristic, the load-sensing remote control device 230 may transmit one or more messages (e.g., via RF signals 206) to a device that is associated with the lighting control system 200, such as the controllable light source 212. For example, the control circuit may cause the wireless communication circuit to transmit the one or more messages in response to a change of the magnitude of the load current flowing through the light bulb 222 that is detected by the sensing circuit.

The one or more messages may include information related to the sensed change of the operational characteristic. The information may include, for example, a measurement of the load current flowing from the AC power source 202, through the light bulb 222. The one or messages may include, for example, commands that cause one or more load control devices that are associated with the load-sensing remote control device 230 to adjust the intensities of corresponding lighting loads in accordance with the sensed change of the operational characteristic. For example, one or more messages transmitted by the load-sensing remote control device 230 may include one or more commands that cause the controllable light source 212 to adjust the intensity of the integral lighting load, for example in accordance with the load current flowing through the light bulb 222.

The load-sensing remote control device 230 may be configured to operate as a state change device. The load-sensing remote control device 230 may be configured to transmit one or more messages that are indicative of a change of state within the lighting control system 200, for example indicative of a change of state of the mechanical switch 204. Such messages may be referred to as change of state messages, or as change of state signals, and may be interpreted by one or more devices that are associated with the load-sensing remote control device 230, such as the controllable light source 212, as indications (e.g., commands) to turn on, turn off, dim, etc. respective lighting loads. For example, the controllable light source 212 may be configured to receive one or more messages transmitted by the load-sensing remote control device 230, and may be configured to turn the integral lighting load on and off in response to the one or more received messages (e.g., to synchronize the integral lighting load with the light bulb 222 in the table lamp 220).

In an alternative example configuration, the mechanical switch 204 may be replaced with a dimmer switch. In such a configuration, the load-sensing remote control device 230 may be configured to measure a magnitude of the load current flowing through the light bulb 222 in the table lamp 220, and to transmit one or more messages that are representative of the magnitude of the load current (e.g., including the measured load current) to the controllable light source 212 (e.g., via RF signals 206), which may cause the controllable light source 212 to attempt to synchronize the intensity of the integral lighting load with the light bulb 222 in the table lamp 220. Alternatively, the load-sensing remote control device 230 may be configured to measure a load voltage across the light bulb 222 in the table lamp 220, in order to determine a firing angle of the dimmer switch (e.g., corresponding to a time at which a triac (or other bidirectional semiconductor switch) inside the dimmer switch is rendered conductive each half cycle), and to determine an intensity of the light bulb 222. The load-sensing remote control device 230 may then transmit one or more messages that are representative of the intensity of the light bulb 222 to the controllable light source 212 (e.g., via RF signals 206), which may cause the controllable light source 212 to attempt to synchronize the intensity of the integral lighting load with the light bulb 222 in the table lamp 220.

The load-sensing remote control device 230 may further include a power supply that is configured to be coupled to the AC power source 202, and may be configured to generate a DC supply voltage for powering the sensing circuit, the control circuit, the wireless communication circuit, and/or other circuitry of the load-sensing remote control device 230, for instance as described in greater detail in commonly-assigned U.S. Pat. No. 7,423,413, issued Sep. 9, 2008, entitled "Power Supply For A Load Control Device," the entire disclosure of which is incorporated herein by reference. Alternatively, the load-sensing remote control device 230 may include a battery for powering the sensing circuit, the control circuit, the wireless communication circuit, and/or other circuitry of the load-sensing remote control device 230.

It should be appreciated that the lighting control system 200 is not limited to the illustrated components and/or configuration. For example, the lighting control system 200 may alternatively include other types of electrical loads that may be plugged into the load-sensing remote control device 230. For example, a television (not shown) may be plugged into the load-sensing remote control device 230, such that the load-sensing remote control device 230 is able to determine whether the television is on, off, or is in a standby mode, for example in response to the magnitude of the load current sensed by the sensing circuit. The controllable light source 212 may be configured to control the intensity of the integral lighting load in response to whether the television is on, off, or in the standby mode, for example as described in greater detail in commonly assigned U.S. patent application Ser. No. 13/726,739, filed Dec. 26, 2012, entitled "Multi-Zone Plug-In Load Control Device," the entire disclosure of which is incorporated herein by reference.

In accordance with another alternative configuration, both the controllable light source 212 and the load-sensing remote control device 230 may include respective RF transceivers, such that the both the controllable light source 212 and the load-sensing remote control device 230 may transmit and receive messages (e.g., via RF signals 206). The controllable light source 212 and the load-sensing remote control device 230 may be associated with (e.g., may participate in) a larger RF load control system. For example, the lighting control system 200 may further include a central controller (not shown), and the load-sensing remote control device 230 may be configured to transmit one or more messages to the central controller.

Figure 4:
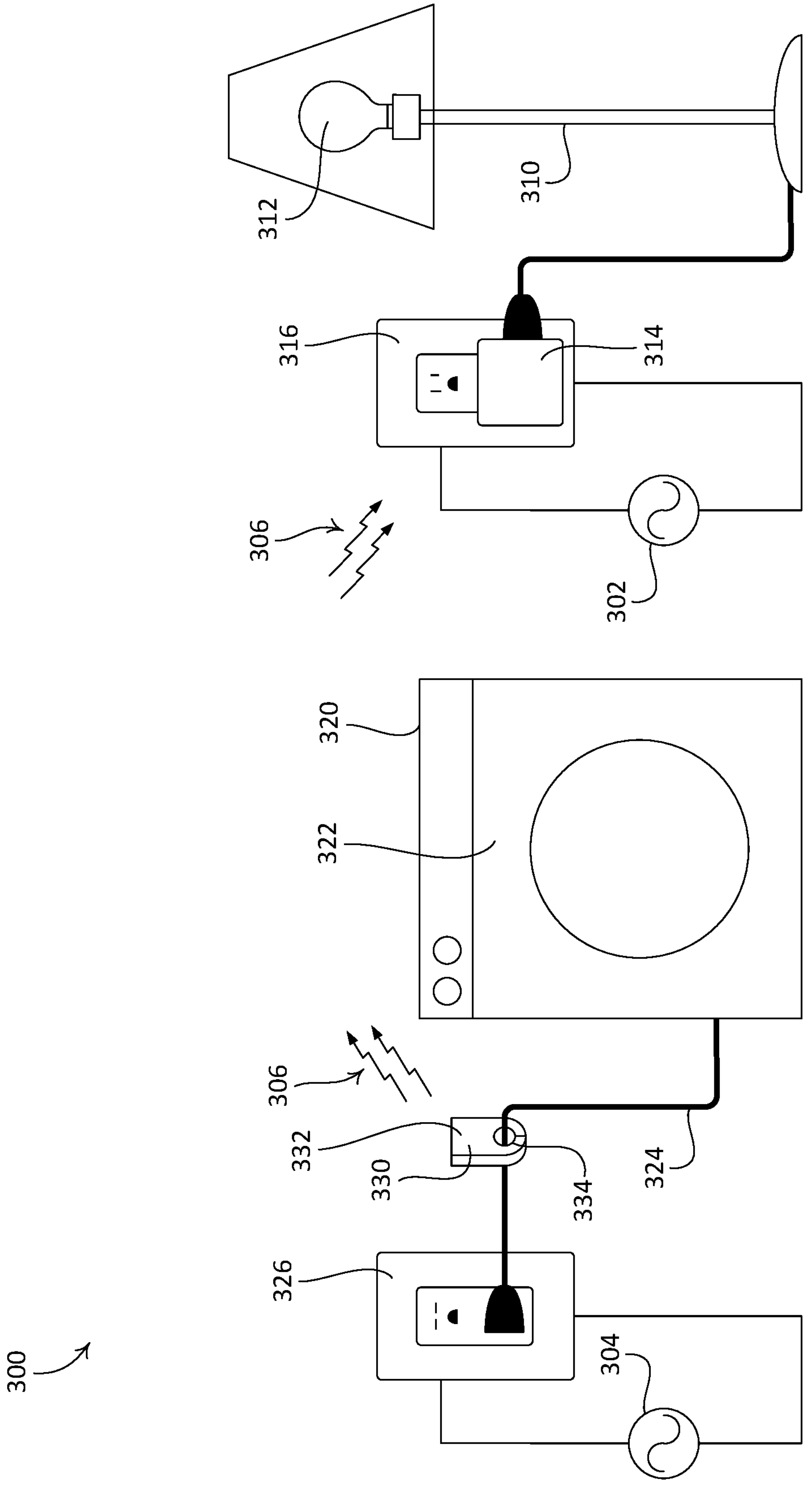
FIG. 4 depicts another example load control system that is configured to control a first electrical load in response to a sensed characteristic of a second electrical load.

FIG. 4 depicts another example load control system that is configured as a lighting control system 300. The lighting control system 300 may include various components that are associated with each other, and that are configured to communicate with one another, for instance via wireless communication. The components of the lighting control system 300 may include, for example one or more load control devices, one or more electrical loads that are controlled via the one or more load control devices, and/or one or more control devices (e.g., load-sensing remote control devices) that are configured to control the load control devices.

As shown, the lighting control system 300 includes a floor lamp 310 and an appliance 320 (e.g., a clothes dryer 322). A lighting load, such as a standard light bulb 312, may be installed in the floor lamp 310. The lighting control system 300 may further include a load control device, such as the plug-in load control device 314. The plug-in load control device 314 may be plugged into a first electrical outlet 316 that receives power from a power source, such as an AC power source 302. The AC power source 302 may be, for example, a 120V AC power source. The plug-in load control device 314 may define a receptacle that is configured to receive a plug (e.g., a standard electrical plug). The floor lamp 310 may be plugged into the receptacle of the plug-in load control device 314. The clothes dryer 322 includes an electrical cord 324 that is plugged into a second electrical outlet 326 that receives power from a power source, such as an AC power source 304. The AC power source 304 may be, for example, a 240V AC power source.

The plug-in load control device 314 may be configured to adjust an amount of power (e.g., AC power) that is delivered to the floor lamp 310, and thus to control an intensity of the light bulb 312, for instance between a low end intensity (e.g., approximately 1%) and a high-end intensity (e.g., approximately 100%). The plug-in load control device 314 may be configured for wireless communication. For example, the plug-in load control device 314 may be configured to receive one or more messages (e.g., digital messages), for example via RF signals 306, and may be configured to turn the light bulb 312 on and off, and/or to adjust the intensity of the light bulb 312, in response to one or more received messages. The lighting control system 300 is not limited to the illustrated plug-in load control device 314. For example, the lighting control system 300 may alternatively include a tabletop load control device, such as the tabletop RF dimmer switch 20 shown in FIG. 1, a screw-in controllable light source, such as the controllable light source 212 shown in FIG. 3, a wall-mounted dimmer switch, or the like.

The lighting control system 300 may be configured such that the floor lamp 310 may be controlled in response to a sensed operational characteristic of the clothes dryer 322. The floor lamp 310 may be referred to as a first electrical load, and the clothes dryer 322 may be referred to as a second electrical load. In this regard, the lighting control system 300 may be configured to control a first electrical load in response to a sensed operational characteristic of a second electrical load. The operational characteristic may comprise, for example, a load current that is flowing from the AC power source 304, through the clothes dryer 322. It should be appreciated that alternatively, the clothes dryer 322 may be referred to as a first electrical load, and the floor lamp 310 may be referred to as a second electrical load, for example depending upon a perspective from which the lighting control system 300 is viewed.

The lighting control system 300 may further include a load-sensing remote control device that is configured to enable the control of a first electrical load of the lighting control system 300 in response to a sensed operational characteristic of a second electrical load of the lighting control system 300. For example, as shown, the lighting control system 300 further includes a load-sensing remote control device 330 that comprises a current clamp remote control device 332. As shown, the current clamp remote control device 332 defines an opening 334 through which the electrical cord 324 of the clothes dryer 322 extends.

The load-sensing remote control device 330 may include a sensing circuit (not shown). The sensing circuit may include, for example, a current clamp meter and/or a current transformer that is configured to detect and/or measure a load current that flows from the AC power source 304, through the clothes dryer 322. For example, the current clamp meter may be configured to be clamped around one of the electrical conductors of the electrical cord 324, and may be configured to measure the magnitude of the load current conducted by the clothes dryer 322. Alternatively, the load-sensing remote control device 330 may be configured to be clamped around all of the conductors of the electrical cord 324 (e.g., hot and neutral conductors), and may be configured to detect a fringing flux or leakage flux to determine whether the clothes dryer 322 is on and is conducting the load current. The load-sensing remote control device 330 may further include a control circuit (not shown), and a wireless communication circuit (not shown) that is communicatively coupled to the control circuit. The control circuit may comprise, for example, a microprocessor. The wireless communication circuit may comprise, for example, a transmitter, such as an RF transmitter, that is configured to transmit messages (e.g., via RF signals 306) in response to the load current detected by the sensing circuit. The plug-in load control device 314 may be associated with the load-sensing remote control device 330, for example during a configuration procedure of the lighting control system 300, such that the plug-in load control device 314 is responsive to messages transmitted by the load-sensing remote control device 330.

The load-sensing remote control device 330 may further include a battery (not shown) for powering the sensing circuit, the control circuit, the wireless communication circuit, and/or other circuitry of the load-sensing remote control device 330. Alternatively, the load-sensing remote control device 330 may be configured to derive power from inductive coupling between the current clamp meter and/or current transformer of the sensing circuit and the electrical cord 324 of the clothes dryer 322, for instance as described in commonly-assigned U.S. patent application publication no. 2013/0214609, published Aug. 22, 2013, entitled "Two-Part Load Control System Mountable To A Single Electrical Wallbox," the entire disclosure of which is incorporated herein by reference.

It should be appreciated that the appliance 320 of the lighting control system 300 is not limited to the illustrated clothes dryer 322, and that the lighting control system 300 may alternatively be implemented with other types of appliances 320, such as, for example, a washing machine, a dishwasher, an oven, a toaster, a microwave, a water heater, a boiler controller, a pool pump, an air conditioner, a compressor, a humidifier, a dehumidifier, a generator, an electric charger, such as an electric vehicle charger, a television or computer monitor, or any suitable electrical load.

The load-sensing remote control device 330 may be configured to sense the operational characteristic of an electrical load (e.g., the load current that flows through the clothes dryer 322) continuously, or at predetermined intervals. The load-sensing remote control device 330 may be configured to detect a change in the operational characteristic, for example a change of a magnitude of the load current flowing from the AC power source 304, through the clothes dryer 322. In response to sensing a change in the operational characteristic, the load-sensing remote control device 330 may transmit one or more messages (e.g., via RF signals 306) to a device that is associated with the lighting control system 300, such as the plug-in load control device 314. For example, the control circuit may cause the wireless communication circuit to transmit the one or more messages in response to a change of the magnitude of the load current flowing through the clothes dryer 322 that is detected by the sensing circuit.

The one or more messages may include information related to the sensed change of the operational characteristic. The information may include, for example, a measurement of the load current flowing from the AC power source 304, through the clothes dryer 322. The one or messages may include, for example, commands that cause one or more load control devices that are associated with the load-sensing remote control device 330 to adjust the intensities of corresponding lighting loads in accordance with the sensed change of the operational characteristic. For example, one or more messages transmitted by the load-sensing remote control device 330 may include one or more commands that cause the plug-in load control device 314 to adjust the intensity of the light bulb 312, for example in accordance with the load current flowing through the clothes dryer 322. To illustrate, the load-sensing remote control device 330 may be configured to detect when the clothes dryer 322 turns off (e.g., via the sensing circuit), and may transmit one or more messages to the plug-in load control device 314. The plug-in load control device 314 may be configured to, in response to receiving the one or more messages indicating that the clothes dryer 322 turned off, cause the light bulb 312 to turn on and off in rapid succession (e.g., to blink). Causing the light bulb 312 to blink may indicate to a user, such as a user in a different part of a building from the clothes dryer 322, that the clothes dryer 322 has finished drying a load of laundry.

The load-sensing remote control device 330 may be configured to operate as a state change device. The load-sensing remote control device 330 may be configured to transmit one or more messages that are indicative of a change of state within the lighting control system 300, for example indicative of a change of state of the clothes dryer 322. Such messages may be referred to as change of state messages, or as change of state signals, and may be interpreted by one or more devices that are associated with the load-sensing remote control device 330, such as the plug-in load control device 314, as indications (e.g., commands) to turn on, turn off, dim, etc. respective lighting loads. For example, the plug-in load control device 314 may be configured to, responsive to receiving one or more messages transmitted by the load-sensing remote control device 330, cause the light bulb 312 to turn on and off (e.g., causing the light bulb 312 to blink one or more times), which may notify a user that the clothes dryer 322 has finished drying a load of laundry.

In an alternative example configuration, the lighting control system 300 may further include a device (not shown) that is configured to provide an indication, for instance via a visual display, in response to receiving one or more messages from the load-sensing remote control device 330.

For example, the lighting control system 300 may include a wall-mounted keypad having an LED that may be illuminated to indicate that the clothes dryer 322 has finished drying a load of laundry. Furthermore, the lighting control system 300 may include a wireless communication device (not shown), such as a smart phone or a tablet device, having a graphical display for indicating that the clothes dryer 322 has finished drying a load of laundry in response to receiving one or more messages from the load-sensing remote control device 330. One or more devices such as the wall-mounted keypad, smart phone, or tablet device may be implemented in addition to, or in place of, the plug-in load control device 314 that is configured to turn the light bulb 312 on and off in response to receiving one or more messages from the load-sensing remote control device 330.

The load-sensing remote control device 330 and the plug-in load control device 314 may be associated with (e.g., may participate in) a larger RF load control system. For example, the lighting control system 300 may further include a central controller (not shown), and the load-sensing remote control device 330 may be configured to transmit one or more messages to the central controller.

Figure 5:
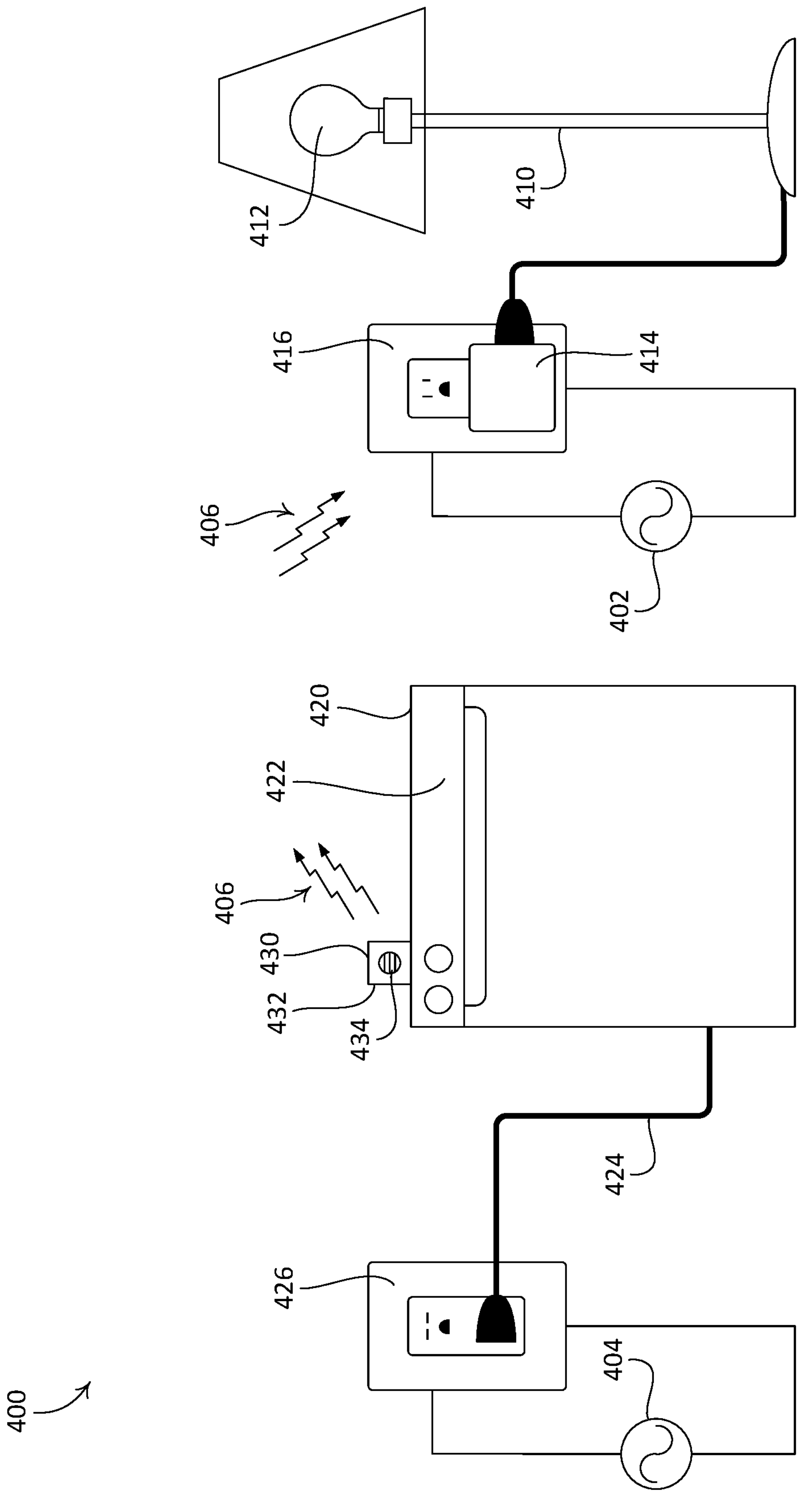
FIG. 5 depicts another example load control system that is configured to control a first electrical load in response to a sensed characteristic of a second electrical load.

FIG. 5 depicts another example load control system that is configured as a lighting control system 400. The lighting control system 400 may include various components that are associated with each other, and that are configured to communicate with one another, for instance via wireless communication. The components of the lighting control system 400 may include, for example one or more load control devices, one or more electrical loads that are controlled via the one or more load control devices, and/or one or more control devices (e.g., load-sensing remote control devices) that are configured to control the load control devices.

As shown, the lighting control system 400 includes a floor lamp 410 and an appliance 420 (e.g., a washing machine 422). A lighting load, such as a standard light bulb 412, may be installed in the floor lamp 410. The lighting control system 400 may further include a load control device, such as the plug-in load control device 414. The plug-in load control device 414 may be plugged into a first electrical outlet 416 that receives power from a power source, such as an AC power source 402. The AC power source 402 may be, for example, a 120V AC power source. The plug-in load control device 414 may define a receptacle that is configured to receive a plug (e.g., a standard electrical plug). The floor lamp 410 may be plugged into the receptacle of the plug-in load control device 414. The washing machine 422 includes an electrical cord 424 that is plugged into a second electrical outlet 426 that receives power from a power source, such as an AC power source 404. The AC power source 404 may be, for example, a 240V AC power source.

The plug-in load control device 414 may be configured to adjust an amount of power (e.g., AC power) that is delivered to the floor lamp 410, and thus to control an intensity of the light bulb 412, for instance between a low end intensity (e.g., approximately 1%) and a high-end intensity (e.g., approximately 100%). The plug-in load control device 414 may be configured for wireless communication. For example, the plug-in load control device 414 may be configured to receive one or more messages (e.g., digital messages), for example via RF signals 406, and may be configured to turn the light bulb 412 on and off, and/or to adjust the intensity of the light bulb 412, in response to one or more received messages. The lighting control system 400 is not limited to the illustrated plug-in load control device 414. For example, the lighting control system 400 may alternatively include a tabletop load control device, such as the tabletop RF dimmer switch 20 shown in FIG. 1, a screw-in controllable light source, such as the controllable light source 212 shown in FIG. 3, a wall-mounted dimmer switch, or the like.

The lighting control system 400 may be configured such that the floor lamp 410 may be controlled in response to a sensed operational characteristic of the washing machine 422. The floor lamp 410 may be referred to as a first electrical load, and the washing machine 422 may be referred to as a second electrical load. In this regard, the lighting control system 400 may be configured to control a first electrical load in response to a sensed operational characteristic of a second electrical load. The operational characteristic may comprise, for example, a sound that is emitted by the appliance 420 (e.g., an audible tone that is emitted by the washing machine 422, noise generated by the washing machine 422 during normal operation, etc.). It should be appreciated that alternatively, the washing machine 422 may be referred to as a first electrical load, and the floor lamp 410 may be referred to as a second electrical load, for example depending upon a perspective from which the lighting control system 400 is viewed.

The lighting control system 400 may further include a load-sensing remote control device that is configured to enable the control of a first electrical load of the lighting control system 400 in response to a sensed operational characteristic of a second electrical load of the lighting control system 400. For example, as shown, the lighting control system 400 further includes a load-sensing remote control device 430 that comprises an audio-responsive remote control device 432. As shown, the audio-responsive remote control device 432 may comprise one or more sound sensors (e.g., a microphone 434) that are configured to detect a sound emitted by the washing machine 422, such as audible tone that is emitted by the washing machine 422 when the washing machine 422 is finished washing a load of laundry.

The load-sensing remote control device 430 may include a control circuit (not shown), and a wireless communication circuit (not shown) that is communicatively coupled to the control circuit. The control circuit may comprise, for example, a microprocessor. The wireless communication circuit may comprise, for example, a transmitter, such as an RF transmitter, that is configured to transmit messages (e.g., via RF signals 406) in response to a sound detected by the microphone 434. The plug-in load control device 414 may be associated with the load-sensing remote control device 430, for example during a configuration procedure of the lighting control system 400, such that the plug-in load control device 414 is responsive to messages transmitted by the load-sensing remote control device 430. The load-sensing remote control device 430 may further include a battery (not shown) for powering the microphone 434, the control circuit, the wireless communication circuit, and/or other circuitry of the load-sensing remote control device 430.

It should be appreciated that the appliance 420 of the lighting control system 400 is not limited to the illustrated washing machine 422, and that the lighting control system 400 may alternatively be implemented with other types of appliances 420, such as, for example, a clothes dryer, a dishwasher, an oven, a toaster, a microwave, a water heater, a boiler controller, a pool pump, an air conditioner, a compressor, a humidifier, a dehumidifier, a generator, an electric charger, such as an electric vehicle charger, a television or computer monitor, or any suitable electrical load.

The load-sensing remote control device 430 may be configured to detect a change in the operational characteristic, for example a change of a sound emitting device of the washing machine 422 (e.g., a speaker) from a quiet (e.g., inactive) state, to an active state in which the sound emitting device of the washing machine 422 emits one or more sounds, for instance to signal that the washing machine 422 has finished washing a load of laundry. Additionally or alternatively, the load-sensing remote control device 430 may be configured to detect a change in a different operational characteristic, for example a reduction in, or lack of, noise generated by the washing machine 422 during normal operation, wherein a lack of normal operational noise may indicate that the washing machine 422 has finished washing a load of laundry. In response to sensing a change in the operational characteristic, the load-sensing remote control device 430 may transmit one or more messages (e.g., via RF signals 406) to a device that is associated with the lighting control system 400, such as the plug-in load control device 414. For example, the control circuit may cause the wireless communication circuit to transmit the one or more messages in response to the microphone 434 detecting one or more sounds emitted by the washing machine 422.

The one or more messages may include information related to the sensed change of the operational characteristic. The information may include, for example, an indication that one or more sounds were detected by the microphone 434 of the washing machine 422. The one or messages may include, for example, commands that cause one or more load control devices that are associated with the load-sensing remote control device 430 to adjust the intensities of corresponding lighting loads in accordance with the sensed change of the operational characteristic. For example, one or more messages transmitted by the load-sensing remote control device 430 may include one or more commands that cause the plug-in load control device 414 to adjust the intensity of the light bulb 412. To illustrate, the load-sensing remote control device 430 may be configured to detect a sound that is emitted by the washing machine 422 (e.g., via the microphone 434) when the washing machine 422 finishes washing a load of laundry, and may transmit one or more messages to the plug-in load control device 414. The plug-in load control device 414 may be configured to, in response to receiving the one or more messages indicating that the washing machine 422 has finished washing a load of laundry, cause the light bulb 412 to turn on and off, for example to blink. Causing the light bulb 412 to blink may indicate to a user, such as a user in a different part of a building from the washing machine 422, that the washing machine 422 has finished washing a load of laundry.

The load-sensing remote control device 430 may be configured to operate as a state change device. The load-sensing remote control device 430 may be configured to transmit one or more messages that are indicative of a change of state within the lighting control system 400, for example indicative of a change of state of the washing machine 422 that is indicated by the washing machine 422 emitting an audible tone. Such messages may be referred to as change of state messages, or as change of state signals, and may be interpreted by one or more devices that are associated with the load-sensing remote control device 430, such as the plug-in load control device 414, as indications (e.g., commands) to turn on, turn off, dim, etc. respective lighting loads. For example, the plug-in load control device 414 may be configured to, responsive to receiving one or more messages transmitted by the load-sensing remote control device 430, cause the light bulb 412 to turn on and off (e.g., cause the light bulb 412 to blink one or more times), which may notify a user that the washing machine 422 has finished washing a load of laundry.

In an alternative example configuration, the lighting control system 400 may further include a device (not shown) that is configured to provide an indication, for instance via a visual display, in response to receiving one or more messages from the load-sensing remote control device 430. For example, the lighting control system 400 may include a wall-mounted keypad having an LED that may be illuminated to indicate that the washing machine 422 has finished washing a load of laundry. Furthermore, the lighting control system 400 may include a wireless communication device (not shown), such as a smart phone or a tablet device, having a graphical display for indicating that the washing machine 422 has finished washing a load of laundry in response to receiving one or more messages from the load-sensing remote control device 430. One or more devices such as the wall-mounted keypad, smart phone, or tablet device may be implemented in addition to, or in place of, the plug-in load control device 414 that is configured to turn the light bulb 412 on and off in response to receiving one or more messages from the load-sensing remote control device 430.

The load-sensing remote control device 430 and the plug-in load control device 414 may be associated with (e.g., may participate in) a larger RF load control system. For example, the lighting control system 400 may further include a central controller (not shown), and the load-sensing remote control device 430 may be configured to transmit one or more messages to the central controller.

Figure 6:
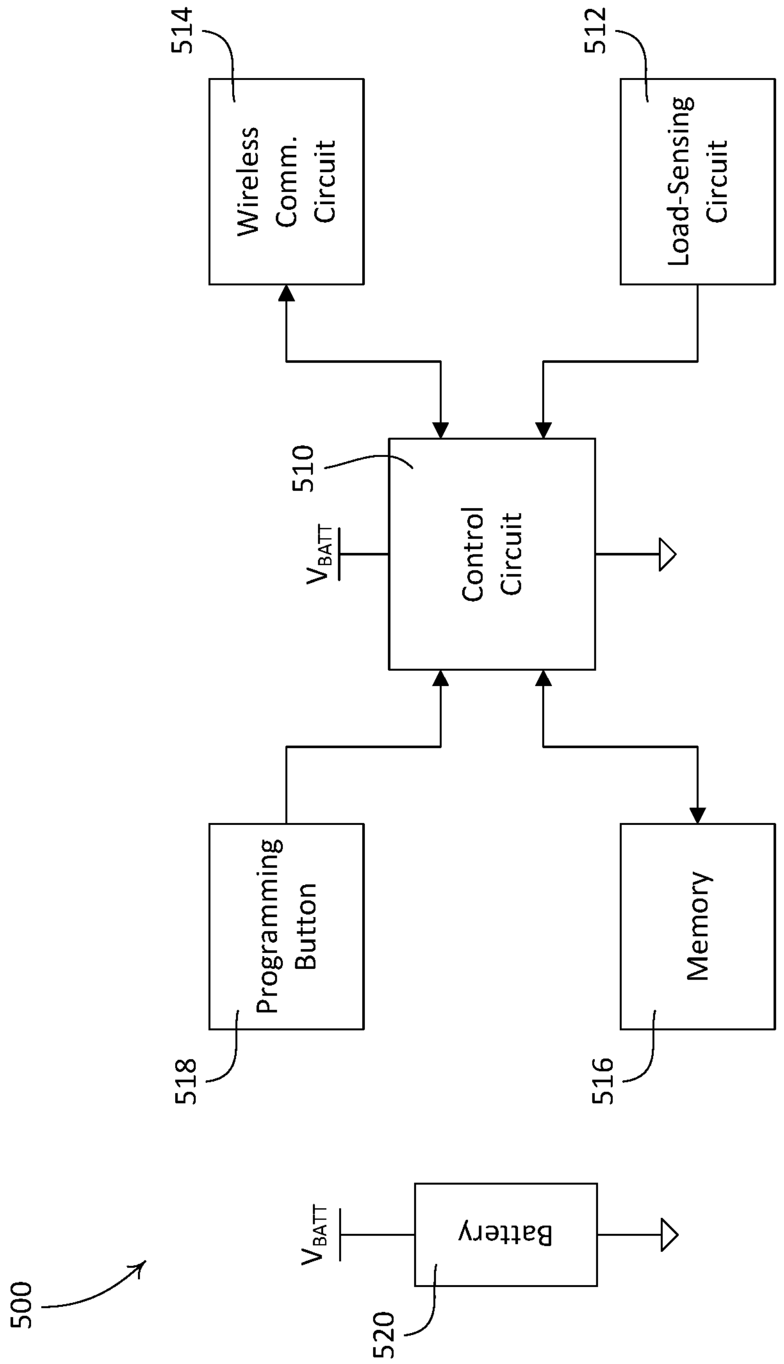
FIG. 6 is a simplified block diagram of an example load-sensing remote control device.

FIG. 6 is a simplified block diagram of an example load-sensing remote control device 500. The load-sensing remote control device 500 may be implemented, for example, as the load-sensing remote control device 130 shown in FIG. 2, as the load-sensing remote control device 230 shown in FIG. 3, as the load-sensing remote control device 330 shown in FIG. 4, and/or as the load-sensing remote control device 430 shown in FIG. 5. The load-sensing remote control device 500 may include a control circuit 510. The control circuit 510 may include one or more of a processor (e.g., a microprocessor), a microcontroller, a programmable logic device (PLD), a field programmable gate array (FPGA), an application specific integrated circuit (ASIC), or any suitable processing device.

The load-sensing remote control device 500 may also include a load-sensing circuit 512 that is communicatively coupled to the control circuit 510 and that is configured to sense an operational characteristic of an electrical load. The operational characteristic may include, for example, a lighting intensity of the electrical load, a state of a light source of the electrical load, a load current that flows through the electrical load, a sound emitted by the electrical load, or another operational characteristic. The load-sensing circuit 512 may comprise one or more sensing devices, for example one or more of: a light sensor (e.g., in accordance with the load-sensing remote control device 130); a load current sensing circuit (e.g., in accordance with the load-sensing remote control device 230 or the load-sensing remote control device 330); or a sound sensor, such as a microphone (e.g., in accordance with the load-sensing remote control device 430). The load-sensing circuit 512 may provide information related to the sensed operational characteristic to the control circuit 510.

The load-sensing remote control device 500 may also include a wireless communication circuit 514 that is communicatively coupled to the control circuit 510. The wireless communication circuit 514 may include, for example, an RF transmitter that is coupled to an antenna for transmitting RF signals. The control circuit 510 may be configured to cause the wireless communication circuit 514 to transmit one or more messages (e.g., via RF signals) in response to the information related to the sensed operational characteristic received from the load-sensing circuit 512. Alternatively, the wireless communication circuit 514 may include an RF receiver for receiving RF signals, an RF transceiver for transmitting and receiving RF signals, or an infrared (IR) transmitter for transmitter IR signals.

The load-sensing remote control device 500 may also include a memory 516. The memory 516 may be communicatively coupled to the control circuit 510, and may operate to store information, such as information associated with the sensed operational characteristic. Such information may include, for example, data related to a time that the sensed electrical load has been on (e.g., operating), a level at which the sensed electrical load has been operating (e.g., an intensity) while on, or the like. The control circuit 510 may be configured to store such information in, and/or to retrieve such information from, the memory 516. For example, the control circuit 510 may cause information related to the sensed operational characteristic to be retrieved from the memory 516, and may cause the wireless communication circuit 514 to transmit one or more messages (e.g., digital messages) that include the information. The memory 516 may include any component suitable for storing such information. For example, the memory 516 may include one or more components of volatile and/or non-volatile memory, in any combination. The memory 516 may be internal and/or external with respect to the control circuit 510. For example, the memory 516 may be implemented as an external integrated circuit (IC), or as an internal circuit of the control circuit 510 (e.g., integrated within a microchip).

The load-sensing remote control device 500 may also include one or more buttons, such as a programming button 518, that are communicatively coupled to the control circuit 510, for instance such that the control circuit 510 may receive respective inputs from the one or more buttons. The control circuit 510 may be configured to initiate an association procedure when the programming button 518 is actuated. The association procedure may associate the load-sensing remote control device 500 with another device, such as a load control device. To illustrate with reference to the lighting control system 100 shown in FIG. 2, the load-sensing remote control device 130 may include a programming button (e.g., programming button 518), and may be associated with the plug-in load control device 114 by pressing and holding the programming button 518, while by pressing and holding a respective programming button of the plug-in load control device 114, for a predetermined period of time.

The load-sensing remote control device 500 may also include an energy storage device, such as a battery 520 (e.g., a coin cell battery). The battery 520 may be configured to provide power (e.g., via voltage $V_{BATT}$) to the control circuit 510, the wireless communication circuit 514, and/or to other low voltage circuitry of the load-sensing remote control device 500.

It should be appreciated that while the example lighting control systems 100, 200, 300, and 400 illustrated in FIGS. 2-5, respectively, are described herein with reference to AC distribution systems, that the apparatuses, features, and/or techniques described herein may be applied to direct-current (DC) distribution systems. It should further be appreciated that the lighting control systems 100, 200, 300, and 400 are not limited to implementations sensing the operational characteristics as described herein, and that the lighting control systems 100, 200, 300, and 400, including the corresponding load-sensing remote control devices 130, 230, 330, 430, may be alternatively configured to sense other suitable operational characteristics, for instance in addition to or in place of, those described herein.

It should further still be appreciated that the sensing features of the various load-sensing remote control devices 130, 230, 330, 430 are not mutually exclusive with respect to each other, and that one or more of the load-sensing remote control devices described herein in may be alternatively configured to include the respective sensing features from one or more others of the load-sensing remote control devices. To illustrate with reference to the lighting control system 400 shown in FIG. 5, the load-sensing remote control device 430 may be alternatively configured to include a photosensing device (e.g., the photosensitive diode of the light sensor 132 of the load-sensing remote control device 130, a camera, or the like) in addition to the sound sensor. The photosensing device may be configured to monitor for and/or to recognize variation in the intensity of light emitted from a light source of the washing machine 422, such as an LED that illuminates when the washing machine 422 is finished washing a load of laundry, for example. In response to sensing illumination of the LED, the load-sensing remote control device 430 may transmit one or more messages (e.g., via RF signals 406) to a device that is associated with the lighting control system 400, such as the plug-in load control device 414.

It should further still be appreciated that the lighting control systems 100, 200, 300, and 400 are not limited to implementations with the corresponding load-sensing remote control devices 130, 230, 330, 430, and that one or more of the lighting control systems 100, 200, 300, and 400 may be alternatively implemented with others of the load-sensing remote control devices 130, 230, 330, 430. To illustrate, the lighting control system 300 may be alternatively implemented with the load-sensing remote control device 430 of the lighting control system 400, and alternatively configured to detect a sound emitted by the clothes dryer 322 when the clothes dryer 322 is finished drying a load of laundry.

It should further still be appreciated that while the example lighting control systems 100, 200, 300, and 400 illustrated in FIGS. 2-5, respectively, are described herein with reference to the corresponding load-sensing remote control devices 130, 230, 330, 430 controlling the intensities of respective lighting loads (e.g., the light bulb 112, the controllable light source 212, the light bulb 312, the light bulb 412), that the load-sensing remote control devices 130, 230, 330, 430 may be additionally or alternatively configured to transmit messages that include commands directed to control other types of devices, such as motorized window treatments.

The invention claimed is:

1. A load control system, comprising:

a load control device to adjust output intensity of an operatively coupled first light fixture across a range between a low-end intensity and a high-end intensity, wherein the load control device includes:

first wireless communication circuitry;

first control circuitry coupled to the first wireless communication circuitry, the first control circuitry to adjust power delivered to the operatively coupled first light fixture; and a load sensing device to sense output intensity of a second light fixture, wherein the load sensing device includes:

second wireless communication circuitry to transmit messages to the first wireless communication circuitry; and second control circuitry coupled to the second wireless communication circuitry, the second control circuitry to:

receive data representative of a change in the output intensity of the second light fixture; and cause the second wireless communication circuitry to transmit the data representative of the sensed change in the output intensity of the second light fixture to the first control circuitry via the first wireless communication circuitry;

wherein, responsive to the receipt of the data representative of the sensed change in the output intensity of the second light fixture, the first control circuitry to:

synchronize an adjustment of the output intensity of the first light fixture with the sensed change in output intensity of the second light fixture.

2. The control device of claim 1 wherein the first control circuitry further comprises:

a programming button;

wherein the first control circuit is further configured to:

detect an actuation of the programming button;

in response to detecting the actuation of the programming button, associate the load sensing device with the load control device so that the load control device is responsive to messages transmitted by the load sensing device.

3. The control device of claim 1, wherein the load sensing device further comprises:

a sensing circuit to provide to the second control circuitry, an output indicative of a sensed change in an electrical current provided to the second light fixture;

wherein the second control circuitry to further:

determine the output intensity of the second fixture based on the electrical current provided to the second light fixture.

4. The load control system of claim 1, wherein the load control device comprises one of a dimmer switch, a plug-in load control device, a tabletop load control device, or a controllable light source.

5. The load control system of claim 2, wherein the first light fixture is configured to be powered using a first electrical circuit and the second light fixture is configured to be powered using a second electrical circuit that is different from the first electrical circuit.

6. The control device of claim 1, wherein in response to sensing the change in the output intensity of the second light fixture, the second control circuit is further configured to:

transmit via the second communication circuit a message that causes a communicatively coupled graphical display device to display a graphical representation of the sensed change in the output intensity of the second light fixture.

7. The load control system of claim 1 wherein the load sensing device further comprises:

a light intensity sensor to provide an output signal proportional to the output intensity of the second light fixture.

8. The load control system of claim 1 wherein to cause the second communication circuitry to transmit the data representative of the sensed change in the output intensity of the second light fixture to the first control circuitry via the first wireless communication circuitry, the second control circuitry to further:

determine whether the sensed change in the luminous output of the second light fixture exceeds a defined threshold value; and cause the second communication circuitry to transmit, to the first control circuitry via the first wireless communication circuitry, the data representative of the sensed change in the luminous output of the second light fixture responsive to the determination that the sensed change in the luminous output of the second light fixture exceeds the defined threshold value.

9. The load control system of claim 1 wherein to cause the second communication circuitry to transmit the data representative of the sensed change in the luminous output of the second light fixture to the first control circuitry via the first wireless communication circuitry, the second control circuitry to further:

cause the second communication circuitry to periodically transmit the data representative of the sensed change in the luminous output of the second light fixture to the load control device.

10. An electric load control method, comprising:

adjusting, by a load control device, an output intensity of an operatively coupled first light fixture across a range between a low-end intensity and a high-end intensity, wherein the load control device includes: first control circuitry; and sensing, by a load sensing device, a change in an output intensity of an operatively coupled second light fixture, wherein the load sensing device includes: second control circuitry; and causing, by the load sensing device, a communication of the data representative of the sensed change in the output intensity of the second light fixture to the first control circuitry;

generating, by the first control circuitry, an output to synchronize adjustment of the output intensity of the first light fixture with the sensed change in the output intensity of the second light fixture responsive to receipt of the data representative of the sensed change in the output intensity of the second light fixture.

11. The method of claim 10 wherein adjusting the output intensity of the operatively coupled first light fixture further comprises:

adjusting, by the load control device, power supplied to the operatively coupled first light fixture.

12. The method of claim 11 wherein sensing the change in the output intensity of the operatively coupled second light fixture further comprises:

sensing, by the load sensing device, a change in the current flow to the second light fixture;

wherein the second control circuitry to further:

determine the output intensity of the second fixture based on the electrical current provided to the second light fixture.

13. The method of claim 11 wherein sensing the change in the output intensity of the operatively coupled second light fixture further comprises:

sensing, by the load sensing device, the change in a power demand of the second light fixture wherein the second control circuitry to further:

determine the output intensity of the second fixture based on the power demand of the second light fixture.

14. The method of claim 10 wherein causing the load sensing device to transmit the data representative of the sensed change in the output intensity of the second light fixture to the load control device further comprises:

determining, by the load sensing device, whether the change in the output intensity of the second light fixture exceeds a defined threshold value; and causing, by the load sensing device, a communication of data representative of the sensed change in the output intensity of the second light fixture to the load control device responsive to the determination that the sensed change in the output intensity of the second light fixture exceeds the defined threshold value.

15. The method of claim 10 wherein causing the load sensing device to transmit the data representative of the sensed change in the output intensity of the second light fixture to the load control device communication circuitry further comprises:

causing, by the load sensing device, the periodic communication of the data representative of the sensed change in the output intensity of the second light fixture to the load control device.

* * * * *